United States Patent [19]

Spencer

[11] 3,920,650

[45] Nov. 18, 1975

[54] ISOALLOXAZINES

[75] Inventor: Claude F. Spencer, Norwich, N.Y.

[73] Assignee: Morton-Norwich Products, Inc., Norwich, N.Y.

[22] Filed: Sept. 19, 1973

[21] Appl. No.: 398,753

[52] U.S. Cl........ 260/251.5; 260/568; 260/256.4 F; 424/252
[51] Int. Cl.² ........................................ C07D 475/02
[58] Field of Search...................... 260/250 Q, 251.5

[56] References Cited
UNITED STATES PATENTS
3,002,974  10/1961  Petering.......................... 260/250 Q

OTHER PUBLICATIONS

Chemical Abstracts, Collective Index 1962–1966, 12,209s, 2nd Col.

*Primary Examiner*—Paul M. Coughlan, Jr.
*Assistant Examiner*—David E. Wheeler
*Attorney, Agent, or Firm*—Anthony J. Franze

[57] ABSTRACT

This invention describes a series of isoalloxazines useful as antibacterial agents.

26 Claims, No Drawings

ISOALLOXAZINES

This invention relates to a series of isoalloxazines of the formula:

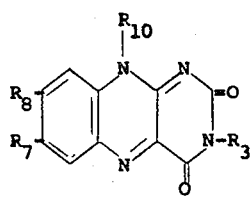

wherein $R_3$ is hydrogen or methyl, hydroxyethyl or benzyl; $R_7$ is bromo, chloro, nitro or trifluoromethyl; $R_8$ is hydrogen, chloro or methyl; and $R_{10}$ is ethyl, propyl, isopropyl, butyl, pentyl, hexyl, phenyl, benzyl, phenethyl, naphthyl, p-tolyl, p-ethylphenyl, p-anisyl, p-ethoxyphenyl, p-butoxyphenyl, 3,4-dichlorophenyl, methoxyethyl, or ethoxyethyl.

dried over $MgSO_4$, and the chloroform distilled at reduced pressure to yield 111 g of red oil.

B. 7-Chloro-10-pentylisoalloxazine

A solution of 111 g (0.457 m) of 4-chloro-N-pentyl-2-nitroaniline (part A) in 500 ml of HOAc was shaken with hydrogen over 1½ teaspoons of No. 28 Raney nickel catalyst, keeping the temperature below 50°C. A pressure drop of 88 psi was recorded (calcd. 93 psi). After removal of the catalyst, the filtrate was stirred overnight with 73 g (0.457 m) of alloxan monohydrate and 91 g (1.47 m) of boric acid. The crude product was filtered, washed with $H_2O$ and ether, then air-dried to yield 80 g. Recrystallization from 500 ml of dimethylformamide, with Darco, and the addition of $H_2O$, yielded 23 g, m.p. 273°–275°C.

Anal. calcd. for $C_{15}H_{15}ClN_4O_2$: C, 56.52; H, 4.74; N, 17.58; Cl, 11.2. Found: C, 56.45; H, 4.72; N, 17.56; Cl, 11.04.

In accordance with the procedure of Example I, substituting other amines in Part A, the following compounds are prepared:

| Example | Amine | Product | M.P.(C°) | C | H | N |
|---|---|---|---|---|---|---|
| II | n-Hexylamine | 7-Chloro-10-hexylisoalloxazine | 260–262 | 57.66 | 5.12 | 16.96 |
| III | β-Naphthylamine | 7-Chloro-10-(β-naphthyl)isoalloxazine | 378–379 | 63.99 | 2.93 | 14.96 |
| IV | Benzylamine | 7-Chloro-10-benzylisoalloxazine | 336–340 | 59.89 | 3.30 | 16.75 |
| V | Phenethylamine | 7-Chloro-10-phenethylisoalloxazine | 307–308 | 60.89 | 3.70 | 15.91 |
| VI | p-Toluidine | 7-Chloro-10-(p-tolyl)isoalloxazine | 339–341 | 60.30 | 3.25 | 16.60 |
| VII | p-Ethylaniline | 7-Chloro-10-(p-ethylphenyl)isoalloxazine | 293–295 | 61.33 | 3.70 | 15.82 |
| VIII | p-Anisidine | 7-Chloro-10-(p-anisyl)isoalloxazine | 334–335 | 57.40 | 3.09 | 15.90 |
| IX | p-Phenetidine | 7-Chloro-10-(p-ethoxyphenyl)isoalloxazine | 294–298 | 58.11 | 3.66 | 15.12 |
| X | p-Butoxyaniline | 7-Chloro-10-(p-butoxyphenyl)isoalloxazine | 255–260 | 60.13 | 4.31 | 14.26 |
| XI | 3,4-Dichloroaniline | 7-Chloro-10-(3,4-dichlorophenyl)isoalloxazine | 344–346 | 48.69 | 1.78 | 14.16 |

The members of the series of isoalloxazines herein described are effective antibacterial agents. They are adapted to be combined with various excipients and adjuvants known in the art to provide conveniently employed forms such as dusts, solutions, suspensions, sprays, unguents and the like capable of controlling and eradicating susceptible bacterial growth. They are particularly inimical to organisms such as *Staphylococcus aureus, Corynebacterium liquefaciens* and Hemophilus vaginalis concentrations of them ranging from one part per twenty thousand to one part per million of media being capable of inhibiting the growth of such organisms under the commonly employed serial dilution technique for ascertaining antibacterial potency.

The methods currently favored for preparing the members of this series of isoalloxazines are set forth in the following examples:

EXAMPLE I

7-Chloro-10-pentylisoalloxazine

A. 4-Chloro-N-pentyl-2-nitroaniline

A mixture of 110 g (0.57 m) of 1,4-dichloro-2-nitrobenzene, 100 g (131 ml, 1.15 m) of n-pentylamine, 40 ml of $H_2O$ and 300 ml of dimethylformamide was heated at reflux overnight. The reaction solution was then poured into 4 liters of ice water. The water was decanted and the red oil dissolved in 300 ml of ethanol, Darco added, and the mixture filtered. The filtrate was then poured into 4 liters of ice water. The mixture was extracted with chloroform, the chloroform solution

EXAMPLE XII 7,8-Dichloro-10-propylisoalloxazine

A. 4,5-Dichloro-N-propyl-2-nitroaniline

A solution of 22.6 g (0.1 m) of 2,4,5-trichloronitrobenzene, 42 ml (30 g, 0.5 m) of n-propylamine and 200 ml of ethanol was heated at reflux overnight. The reaction mixture was then chilled and filtered and the product washed and air-dried to give 18 g, m.p. 53°–57°C.

B. 7,8-Dichloro-10-propylisoalloxazine

A solution of 18 g (0.07 m) of 4,5-dichloro-N-propyl-2-nitroaniline (part A) in 100 ml of HOAc was shaken with hydrogen over one-half teaspoon of No. 28 Raney nickel catalyst, keeping the temperature below 50°C. After a pressure drop of 15 psi (calcd, 14.5 psi) the catalyst was removed by filtration. The filtrate was then stirred overnight at room temperature with 11.5 g (0.07 m) of alloxan monohydrate and 13.4 g (0.21 m) of boric acid. The mixture was filtered and the solid washed with $H_2O$, ethanol and ether, then air-dried to give 21.5 g. Recrystallization from 50 ml of dimethylformamide with Darco, followed by a second recrystallization from 300 ml of HOAc and $H_2O$, resulted in 12 g of product, m.p. 310°–311°C.

Anal. calcd, for $C_{13}H_{10}Cl_2N_4O_2$: C, 48.02; H, 3.10; N, 17.23; Cl, 21.81. Found: C, 47.75; H, 3.16; N, 17.07; Cl, 21.77.

In accordance with the procedure of Example XII, substituting other amines in Part A, the following compounds are prepared:

| Example | Amine | Product | M.P.(C°) | C | H | N | Cl |
|---|---|---|---|---|---|---|---|
| XIII | Isopropylamine | 7,8-Dichloro-10-isopropylisoalloxazine | 381–382 | 47.68 | 3.12 | 17.43 | 21.79 |
| XIV | Aniline | 7,8-Dichloro-10-phenylisoalloxazine | 372–376 | 53.32 | 2.21 | 15.55 | 19.91 |

EXAMPLE XV

7-Chloro-3-methyl-10-phenylisoalloxazine

A. 4-Chloro-N-phenyl-2-nitroaniline

A solution of 192 g (1.0 m) of 1,4-dichloro-2nitrobenzene, 82 g (1.0 m) of sodium acetate and 300 ml (475 g, 5.1 m) of aniline was heated overnight at reflux, allowed to cool, then poured into 4 liters of ice water. The oil layer containing the product was separated from the aqueous layer and crystallized from 2000 ml of ethanol with Darco, and $H_2O$ added to the cloud point. After standing 4 days, 113 g, m.p. 58°–61°C., was obtained.

B. 7-Chloro-10-phenylisoalloxazine

A solution of 59.5 g (0.24 m) of 4-chloro-N-phenyl-2-nitroaniline (Part A) in 500 ml of HOAc was shaken with hydrogen over 2 teaspoons of No. 28 Raney nickel catalyst. A pressure drop of 48 psi (calcd. 48.2 psi) was observed. The catalyst was filtered, and the filtrate stirred overnight at room temperature with 38.4 g (0.24 m) of alloxan monohydrate and 44.5 g (0.72 m) of boric acid. The crude product was removed by filtration, washed with $H_2O$, ethanol, and ether to give 82 g, unmelted at 405°C. Recrystallization from 2000 ml of dimethylformamide, with Darco, and $H_2O$ added to the cloud point yielded 33 g, m.p. 384°–386°C.

Anal. calcd. for $C_{16}H_9ClN_4O_2$: C, 59.18; H, 2.79; N, 17.26; Cl, 10.92. Found: C, 59.10; H, 2.97; N, 17.35; Cl, 10.73.

C. 7-Chloro-3-methyl-10-phenylisoalloxazine

To a suspension of 40 g (0.12 m) of B in 1 liter of dimethylformamide was added 5 g (0.12 m) of sodium hydride (60% in mineral oil) with stirring and heating on the steam bath. A dark solution was soon effected. After further heating with stirring for 1½ hr, 19 g (20% excess) of dimethyl sulfate was added in about 5 min. During this period, the reaction mixture gradually turned to orange-red while solid started to separate.

After 2 hr of heating and stirring, the mixture was allowed to cool and then filtered. The orange solid was washed with dimethylformamide and air-dried. It was further triturated well with water, filtered, washed with water and dried. The yield was 22 g (53%).

Recrystallization of 2 g from 100 ml of dimethylformamide gave 1.3 g of analytically pure product, m.p. >400°.

Anal. calcd. for $C_{17}H_{11}ClN_4O_2$: C, 60.27; H, 3.27; N, 16.54. Found: C, 60.19; H, 3.28; N, 16.58.

EXAMPLE XVI

7-Chloro-3-(2-hydroxyethyl)-10-phenylisoalloxazine

To a suspension of 49 g (0.15 m) of the compound of Example XV, B, in 1 liter of dimethylformamide was added 6 g (0.15 m) of sodium hydride (60% in mineral oil) with stirring on the steam bath. A clear solution was obtained after 1½ hr of heating and stirring and then 20 g (0.25 m) of ethylene chlorohydrin was added. The mixture was further heated for 3½ hr and then allowed to stand overnight.

The mixture was poured onto cracked ice and allowed to stand for a few hours. The solid was collected, washed well with water and dried at 100°. The yield was 37.5 g (88%).

Recrystallization of 5.4 g from 35 ml of dimethylformamide and water gave 3.5 g of analytically pure product, m.p. 283°–285°.

Anal. calcd. for $C_{18}H_{13}ClN_4O_3$: C, 58.26; H, 3.55; N, 15.20. Found: C, 58.42; H, 3.63; N, 15.35.

EXAMPLE XVII

3-Benzyl-7-chloro-10-phenylisoalloxazine

To a mixture of 49 g (0.15 m) of the compound of Example XV, B, in 1.2 liters of dimethylformamide was added 7 g (0.18 m) of sodium hydride (60% in mineral oil) on the steam bath with stirring. After a clear solution was obtained, 30 g (0.18 m) of benzyl bromide was added through the condenser. After 2 hr of heating and stirring, the reaction mixture was poured onto cracked ice and allowed to stand for a few hours.

The solid was collected, washed well with water and dried at 100°. The yield was 44 g (71%).

Recrystallization of 1 g from ethanol (110 ml) and acetonitrile (5 ml) gave 0.7 g of analytically pure product, m.p. 293°–296°.

Anal. calcd. for $C_{23}H_{15}ClN_4O_2$: C, 66.59; H, 3.64; N, 13.51. Found: C, 66.45; H, 3.65; N, 13.47.

EXAMPLE XVIII

10-Isopropyl-7-nitroisoalloxazine

A. $N^1$-Isopropyl-4-nitro-o-phenylenediamine

A slow stream of $H_2S$ was passed into a mixture of 338 g (1.5 m) of N-isopropyl-2,4-dinitroaniline, 1200 ml of 28% $NH_4OH$ and 2400 ml of ethanol, keeping the temperature at 45°–55°C. During the 2 hr addition, the yellow mixture became a dark purple solution. Stirring was continued at 45°–55°C for 60 minutes after the addition. The reaction mixture was chilled, and the red-orange crystals which precipitated were filtered off, washed with $H_2O$, and air-dried to give 225 g, m.p. 71°–75°C.

The $H_2S$ reduction of the 225 g (mixture of the dinitroaniline and diamine) was repeated, using 925 ml of 28% $NH_4OH$ and 1850 ml of ethanol. After air-drying the yield was 84 g, m.p. 113°–115°C.

10-Isopropyl-7-nitroisoalloxazine

A mixture of 84 g (0.043 m) of $N^1$-isopropyl-4-nitro-o-phenylenediamine (part A), 69 g (0.043 ml) of alloxan monohydrate, 79.8 g (1.29 m) of boric acid in 500 ml of HOAc was stirred overnight. The orange solid was filtered washed with $H_2O$, ethanol, and ether and air-dried to give 141 g. Recrystallization from 600 ml of dimethylformamide, with Darco, and the addition of 60 ml of $H_2O$ to the filtrate, yielded 85 g, m.p. 363°–367°.

Anal. calcd. for $C_{13}H_{11}N_5O_4$: C, 51.83; H, 3.68; N, 23.25. Found: C, 51.63; H, 3.60; N, 23.57.

EXAMPLE XIX

10-Butyl-7-nitroisoalloxazine

A. $N^1$-Butyl-4-nitro-o-phenylenediamine

A slow stream of $H_2S$ was passed into a mixture of 310 g (1.3 m) of N-butyl-2,4-dinitroaniline, 1200 ml of 28% $NH_4OH$ and 2400 ml of ethanol, keeping the temperature at 45°–55°C. Stirring was continued at 45°–55°C for 60 minutes after the $H_2S$ addition, then the reaction mixture was cooled overnight, filtered, washed with $H_2O$, and air-dried to give 218 g. Recrystallization from 500 ml of toluene yielded 180 g, m.p. 106°–108°C.

B. 10-Butyl-7-nitroisoalloxazine

A mixture of 125 g (0.6 m) of $N^1$-butyl-4-nitro-o-phenylenediamine (part A), 96 g (0.6 m) of alloxan monohydrate, 111 g (1.8 m) of boric acid and 1000 ml of HOAc was stirred overnight. The yellow precipitate was filtered off, washed with $H_2O$, SDA-32 and ether, then air-dried. The 121 g of crude product was recrystallized from 300 ml of dimethylformamide, with Darco, followed by a second recrystallization from 300 ml of dimethylformamide and 150 ml of $H_2O$ and oven-dried (110°C) to yield 43 g, m.p. 255°–258°C.

Anal. calcd. for $C_{14}H_{13}N_5O_4$: C, 53.33; H, 4.16; N, 22.22. Found: C, 53.57; H, 4.35; N, 22.36.

EXAMPLE XX

10-Methoxyethyl-7-nitroisoalloxazine

A. N-Methoxyethyl-2,4-dinitroaniline

To a warmed solution of 101.5 g (0.5 m) of 1-chloro-2,4-dinitrobenzene and 300 ml of dimethylformamide was added slowly, 115.5 g (1.0 m) of 65%–70% 2-methoxyethylamine in water. The solution was heated under reflux for 5 hr, during which time an orange crystalline solid separated. The mixture was chilled, the product filtered, washed and air-dried to yield 117 g, m.p. 142°–148°C.

B. $N^1$-Methoxy-4-nitro-o-phenylenediamine

A slow stream of $H_2S$ was passed into a solution of 117 g (0.49 m) of N-methoxyethyl-2,4-dinitroaniline (part A), 448 ml of 28% $NH_4OH$ and 896 ml of ethanol, maintaining a temperature of 45°–55°C. Stirring was continued at 45°–55°C for 60 min. following the 4 hr addition. After chilling overnight, the mixture was filtered, washed with $H_2O$ and air-dried to give 63 g, m.p. 101°–104°C.

C. 10-Methoxyethyl-7-nitroisoalloxazine

A mixture of 63 g (0.30 m) of N-methoxyethyl-4-nitro-o-phenylenediamine (part B), 47.7 g (0.30 m) of alloxan monohydrate, 54.8 g (0.89 m) of boric acid and 400 ml of HOAc was stirred overnight at room temperature. The precipitated product was collected by filtration, washed with $H_2O$, ethanol, and ether, then air-dried to give 129 g. Recrystallization from 800 ml of dimethylformamide, with Darco, and $H_2O$ added to the cloud point yielded 64 g, m.p. 307°–308°C.

Anal. calcd. for $C_{13}H_{11}N_5O_5$: C, 49.21; H, 3.49; N, 22.08. Found: C, 49.24; H, 3.49; N, 22.27.

EXAMPLE XXI

10-Ethoxyethyl-7-nitroisoalloxazine

A. N-Ethoxyethyl-2,4-dinitroaniline

A solution containing 101.5 g (0.5 m) of 1-chloro-2,4-dinitrobenzene, 89.1 g (1.0 m) of ethoxyethylamine and 300 ml of dimethylformamide was heated at reflux for 5 hrs then chilled overnight. The yellow precipitate was filtered, and $H_2O$ added to the filtrate. The product was filtered, washed with $H_2O$, and air-dried to give 112 g, m.p. 74°–78°C.

B. $N^1$-Ethoxyethyl-4-nitro-o-phenylenediamine

A slow stream of $H_2S$ was passed into a mixture of 112 g (0.44 m) of N-ethoxyethyl-2,4-dinitroaniline (part A), 405 ml of 28% $NH_4OH$ and 810 ml of ethanol. A temperature of 45°–55°C was maintained throughout the 4 hr addition and for 60 min. following the addition. The mixture was chilled overnight, then filtered and washed with $H_2O$ and air-dried to yield 52 g, m.p. 86°–88°C.

C. 10-Ethoxyethyl-7-nitroisoalloxazine

A mixture of 52 g (0.23 m) of $N^1$-ethoxyethyl-4-nitro-o-phenylenediamine (part B), 36.9 g (0.23 m) of alloxan monohydrate, 42.9 g (0.69 m) of boric acid and 375 ml of HOAc was stirred overnight at room temperature. The crude product was filtered, washed with $H_2O$, ethanol, and ether, then air-dried to give 93 g. Recrystallization from 300 ml of dimethylformamide, with Darco, and $H_2O$ added to the cloud point, gave 21 g, m.p. 265°–267°C.

Anal. calcd. for $C_{14}H_{13}N_5O_5$: C, 50.75; H, 3.96; N, 21.14. Found: C, 50.87; H, 3.89; N, 21.13.

EXAMPLE XXII

10-Ethyl-7-trifluoromethylisoalloxazine

A. N-Ethyl-4-trifluoromethyl-2-nitroaniline

To a heated solution of 113 g (0.5 mole) of 2-nitro-4-trifluoromethyl chlorobenzene in 200 ml of ethanol was added slowly 200 ml (2.2 mole) of 70% ethylamine. The solution was heated at reflux for 30 minutes after the addition then allowed to cool overnight. The product was filtered, washed with ethanol-ether, and air-dried to yield 111 g, m.p. 54°–55°C.

B. 10-Ethyl-7-trifluoromethylisoalloxazine

A mixture of 104 g (0.44 mole) of N-ethyl-4-trifluoromethyl-2-nitroaniline (part A) in 800 ml of HOAc was shaken with hydrogen over two teasspoonsful of No. 28 Raney nickel catalyst. The pressure drop was 98.5 psi. (calcd. 100 psi). After removal of the catalyst by filtration, the filtrate was stirred overnight with 71 g (0.44 mole) of alloxan monohydrate and 82 g (133 mole) of boric acid. The crude product was filtered, washed with $H_2O$, ethanol and ether and recrystallized from 1250 ml of dimethylformamide, with Darco, and 125 ml of $H_2O$ added to the filtrate. The yield was 40 g, m.p. 330°–332°C.

Anal. calcd. for $C_{13}H_9F_3N_4O_2$: C, 50.33; H, 2.92; N, 18.06. Found: c, 50.32; H, 2.92; N, 18.14.

In accordance with the procedure of Example XXII, substituting other amines in Part A, the following compounds are prepared:

| Example | Amine | Product | M.P.(C°) | C | H | N |
|---------|-------|---------|----------|---|---|---|
| XXIII | Isopropylamine | 7-Trifluoromethyl-10-isopropylisoalloxazine | 292–293 | 51.62 | 3.32 | 17.41 |
| XXIV | Aniline | 7-Trifluoromethyl-10-phenylisoalloxazine | 338–341 | 56.86 | 2.51 | 15.84 |

EXAMPLE XXV

10-(p-Anisyl)-7-chloro-8-methylisoalloxazine

A. N-(p-Anisyl)-4-chloro-5-methyl-2-nitroaniline

A mixture of 83 g (0.29 m) of 2-chloro-4,5-dinitrotoluene, 71.3 g (0.58 m) of p-anisidine and 500 ml of ethanol was heated at reflux for 36 hours. It was then poured into 4 liters of ice water. The water was decanted from the black oil which had separated and dissolved in 500 ml of $CHCl_3$, dried over anhydrous $MgSO_4$ and the $CHCL_3$ distilled at reduced pressure to yield a dark oil, weighing 65 g.

B. 10-(p-Anisyl)-7-chloro-8-methylisoalloxazine

A mixture of 65 g (0.22 m) of N-anisyl-4-chloro-5-methyl-2-nitroaniline (part A), 1 teaspoon of No. 28 Raney nickel catalyst and 300 ml of HOAc was shaken with hydrogen. After a pressure drop of 47 psi (calcd. 43.8 psi), the catalyst was removed by filtration. To the filtrate was added 35 g (0.22 m) of alloxan monohydrate and 40 g (0.65 m) of boric acid. After stirring overnight, the crude product was filtered, washed with $H_2O$, ethanol and ether, then air-dried to give 75 g. Recrystallization from 1000 ml of dimethylformamide, with Darco, and $H_2O$ yielded 36 g, m.p. decomposes 313°–315°C.

Anal. calcd. for $C_{18}H_{13}ClN_4O_3$: C, 58.62; H, 3.55; N, 15.20; Cl, 9.61. Found: C, 58.50; H, 3.52; N, 15.32; Cl, 9.62.

EXAMPLE XXVI

7-Bromo-10-ethylisoalloxazine

A. 4-Bromo-N-ethyl-2-nitroaniline

A mixture of 200 g (0.72 mole) of 2,5-dibromonitrobenzene, 330 ml (161 g, 3.58 mole) of 70% ethylamine and 300 ml of dimethylformamide was heated under reflux overnight. The reaction mixture was chilled in an ice bath, and the product removed by filtration and air-dried to give 129 g, m.p. 77°–83°C.

B. 7-Bromo-10-ethylisoalloxazine

A solution of 87 g (0.38 mole) of 4-bromo-10-ethyl-2-nitroaniline (part A) in 500 ml of HOAc was shaken with hydrogen over 1 teaspoonful No. 28 Raney nickel catalyst, keeping the temperature below 50°C. A pressure drop of 71 psi was recorded (calcd. 75.5 psi). The catalyst was removed by filtration. A second run was made in the same manner. The combined filtrates were stirred overnight at room temperature with 120 g (0.75 mole) of alloxan monohydrate and 130 g (2.25 mole) of boric acid. The crude product was filtered, washed with $H_2O$, ethanol, and ether, then air-dried to give 250 g. Recrystallization from 3200 ml, of dimethylformamide, with Darco, and $H_2O$ added to the cloud point yielded 38 g, m.p. 320°–321°C dec.

Anal. calcd. for $C_{12}H_9BrN_4O_2$: C, 44.88; H, 2.82; N, 17.45; Br, 24.88. Found: C, 44.97; H, 2.76; N, 17.37; Br, 24.92.

The antibacterial potency of members of this series of isoalloxazines as determined by the commonly used serial dilution technique is set forth below:

| Compound of Example | Minimal Inhibitory Concentration in mcg/ml | | |
|---|---|---|---|
| | A | B | C |
| I | 6.25 | 1.5 | 6.25 |
| II | 12.5 | 3.1 | 25 |
| III | 6.25 | 25 | 3.1 |
| IV | 12.5 | 3.1 | 6.25 |
| V | 6.25 | 6.25 | 12.5 |
| VI | 25 | 3.1 | 25 |
| VII | 12.5 | 3.1 | 12.5 |
| VIII | 50 | 6.25 | 25 |
| IX | 50 | 6.25 | 6.25 |
| X | 6.25 | 3.1 | 12.5 |
| XI | 12.5 | 0.75 | 25 |
| XII | 12.5 | 6.25 | 6.25 |
| XIII | 12.5 | 12.5 | 12.5 |
| XIV | 25 | 3.1 | 6.25 |
| XV | 50 | 50 | 25 |
| XVI | 25 | 6.25 | 50 |
| XVII | 6.25 | 6.25 | 12.5 |
| XVIII | — | 25 | 12.5 |
| XIX | 50 | 25 | 50 |
| XX | — | 25 | 50 |
| XXI | 100 | 25 | 6.25 |
| XXII | 25 | 12.5 | 25 |
| XXIII | 50 | 50 | 25 |
| XXIV | 50 | 3.1 | 25 |
| XXV | 50 | 6.25 | 25 |
| XXVI | 50 | 12.5 | 25 |

In the above, A represents *Staphylococcus aureus*; B represents *Corynebacterium liquefaciens*; and C represents *Hemophilus vaginalis*.

What is claimed is:

1. The compound 7-chloro-10-pentylisoalloxazine.
2. The compound 7-chloro-10-hexylisoalloxazine.
3. The compound 7-chloro-10-(β-naphthyl)isoalloxazine.
4. The compound 7-chloro-10benzylisoalloxazine
5. The compound 7-chloro-10-phenethylisoalloxazine.
6. The compound 7-chloro-10-(p-tolyl)isoalloxazine.
7. The compound 7-chloro-10-(p-ethylphenyl)isoalloxazine.
8. The compound 7-chloro-10-(p-anisyl)isoalloxazine.
9. The compound 7-chloro-10-(p-ethoxyphenyl)isoalloxazine.
10. The compound 7-chloro-10-(p-butoxyphenyl)isoalloxazine.
11. The compound 7-chloro-10-(3,4-dichlorophenyl)isoalloxazine.
12. The compound 7,8-dichloro-10-propylisoalloxazine.
13. The compound 7,8-dichloro-10-isopropylisoalloxazine.
14. The compound 7,8-dichloro-10-phenylisoalloxazine.
15. The compound 3-methyl-7-chloro-10-phenylisoalloxazine.
16. The compound 3-(2-hydroxyethyl)-7-chloro-10-phenylisoalloxazine.
17. The compound 3-benzyl-7-chloro-10-phenylisoalloxazine.
18. The compound 7-nitro-10-isopropylisoalloxazine.
19. The compound 7-nitro-10-butylisoalloxazine.
20. The compound 7-nitro-10-methoxyethylisoalloxazine.
21. The compound 7-nitro-10-ethoxyethylisoalloxazine.
22. The compound 7-trifluoromethyl-10-ethylisoalloxazine.
23. The compound 7-trifluoromethyl-10-isopropylisoalloxazine.
24. The compound 7-trifluoromethyl-10-phenylisoalloxazine.
25. The compound 7-chloro-8-methyl-10-(p-anisyl)isoalloxazine.
26. The compound 7-bromo-10-ethylisoalloxazine.

* * * * *